United States Patent Office 3,010,950
Patented Nov. 28, 1961

3,010,950
POLYTETRAFLUOROETHYLENE FINE POWDERS
Paul Elliot Thomas, Wilmington, Del., assignor to E. I. du Pont de Nemours and Company, Wilmington, Del., a corporation of Delaware
No Drawing. Filed Nov. 15, 1956, Ser. No. 622,265
1 Claim. (Cl. 260—92.1)

This invention relates to polytetrafluoroethylene resin and more especially to an improved polytetrafluoroethylene fine powder having among other desirable attributes, special suitability for sheet calendering and paste molding operations.

The term "polytetrafluoroethylene fine powder" as used herein refers to polytetrafluoroethylene powder having a total surface area of at least 9, ordinally 9 to 12, square meters per gram as measured by nitrogen adsorption, for example, by the procedure described by W. E. Barr and Victor J. Anhorn in chapter XII of "Scientific and Industrial Glass Blowing and Laboratory Techniques," published in 1949 by Instruments Publishing Company. Such powders are commercially available. They may be conveniently obtained by coagulating and dewatering aqueous colloidal dispersions of polytetrafluoroethylene, for example, by the procedure described by J. F. Lontz in U.S. Patent 2,593,583, issued April 22, 1952.

The polytetrafluoroethylene fine powders hitherto available may be calendered into thin tapes, 1 to 25 mils in thickness, which may be used as such or "sintered" by heating to temperatures above 327° C. and then cooling, to obtain a stronger, less permeable product, as disclosed, for example, in the aforesaid Lontz patent. They may also be employed as ingredients of pressure-coalescing compositions, comprising a blend of the powder with a lubricant, which are useful in fabricating articles such as tubing, wire coverings, tapes, and the like by extrusion, calendering or molding, followed by gentle heating or extraction to remove lubricant and then sintering, as disclosed, for example, in U.S. Patents 2,586,357, issued to W. E. Llewellyn, on February 19, 1952, and 2,685,707, issued to W. E. Llewellyn and J. F. Lontz, on December 27, 1955.

Hitherto, however, it has been quite difficult to fabricate polytetrafluoroethylene fine powder into non-porous sheeting, particularly where widths of 12 inches or more or thicknesses of 25 mils or more are required, by the desirably simple technique involving calendering the unlubricated fine powder. By the term "non-porous sheeting" as used herein, is meant sheeting free from pinholes as judged by high-voltage spark test, with a short-time dielectric strength uniformly above 400 volts per mil (via ASTM D-149-49T in Primol D), and a $CO_2$ permeability rate not greater than $1 \times 10^{-13}$ moles-cm./cm.$^2$/sec./cm. Hg pressure at room temperature.

Non-porous sheeting is especially valuable in a number of applications, such as linings for food and chemical processing equipment, high temperature electrical insulation, anti-fouling sheathing for boat hulls, and the like. In many such applications, sheeting of large size is especially desirable in order to minimize the number of bonding operations necessary to obtain a complete sheath of covering or insulation. Sheeting 25 mils or more in thickness is frequently necessary to achieve adequate total resistance to permeation under use conditions. The copending application of P. E. Thomas and C. G. Wallace U.S. S.N. 622,253, filed on even date herewith, discloses a convenient method of preparing large non-porous sheets 25 mils or more in thickness, by molding an improved polytetrafluoroethylene granular powder. It is, however, quite difficult to fabricate and sinter granular powder into non-porous sheets by way of a calendering operation. Accordingly, in applications requiring non-porous sheets of moderate strength and toughness, the ready calenderability and sinterability of ordinary fine powder would be advantageous, provided the sheets could be made non-porous. A product advantage should also stem from the suitability of calendering operations for production of continous sheet.

The calendering techniques described in the prior art, however, do not produce non-porous tape or sheeting from available fine powders. Instead the products obtained ordinarily contain at least a few electrical flaws for which compensation is made by using two or more layers of tape or sheet, so that the flaws are masked, if an electrically integral barrier is required. Moreover, even usual quality standards are not achieved when it is attempted to produce widths of 12 inches or more, or thicknesses of 25 mils or more, since the unsintered calendered products are too weak to withstand the mechanical and thermal stresses ordinarily involved in taking them to and through the sintering operation. Although during the course of the present investigation there has been developed a modified calendering technique, hereinafter described, which is capable of producing non-porous sheeting from available fine powders, the technique is fairly elaborate and tedious, so that further improvement is highly desirable.

Difficulties have also been encountered in attempting to mold lubricated pressure-coalescing compositions of currently available powders into thin flawless shapes, such as tumblers, flanged flexible diaphragms, electrical coil forms, expansion joints, terminal blocks, and the like, where point stresses arising from the deformation of the pressure-coalescing composition to fill the mold are significant in two directions, i.e., predominantly biaxial. Experience has shown that the application of predominantly biaxial stresses as necessary in molding these objects from such compositions result in preforms which crack or split during drying or sintering operations.

It is a general object of the present invention to provide an improved polytetrafluoroethylene fine powder. A more specific object is to provide a polytetrafluoroethylene fine powder which can be lubricated and molded under predominantly biaxial stresses into shapes sinterable to sound flawless articles. In a different aspect, it is an object of the present invention to provide novel processes for the manufacture of continuous non-porous calendered sheeting, and flawless biaxially molded articles of polytetrafluoroethylene. Other objects will be apparent hereinafter.

According to the present invention it has been found that the aforesaid objects are achieved by a new polytetrafluoroethylene fine powder of high crystallinity which contains a major proportion of submicroscopic bola-shaped particles, said powder having an infra-red amorphous index of less than 0.15 and a negative 83/17 methanol-water wettability as determined by test procedures hereinafter described.

On examination by means of the electron microscope at 10,000 diameters magnification, the novel powders of the present invention appear mainly as a complex network of roughly spherical particles, generally ranging from about 0.1 to 0.3 micron in diameter, at least half of which are connected to at least one other such particle by means of at least one elongated microfibrous portion, i.e., an elongated shape, generally of a diameter ranging from about 0.01 to 0.05 micron and of a length ranging from about 0.2 to 6 microns. The term "bola-shaped" is used herein as descriptive of these interconnected submicroscopic particles.

The term "infra-red amorphous index," as used herein, refers to a parameter which may be determined by measuring the absorbance of film, pressed from the powder, at a wave length of 4.25 microns, and at a wave length of 12.8 microns, and comparing the relative absorbances at these peaks. In a preferred test method, a 0.06 gram sample of powder is pressed at 5000 pounds force in a chip mold having an area of about 2 square centimeters. The resulting thin disc is scanned at wave lengths in the ranges of 4 to 5 and 12 to 14 microns. It has been found from X-ray correlations that the peak absorption bands in the 4–5 micron range are fairly constant in polytetrafluoroethylene over the usual range of crystalline content, while the peak absorption bands in the 12–14 micron range are characteristic of amorphous material. The "infra-red amorphous index" is calculated as the ratio of net absorbances at the peaks occurring at 12.8 and 4.25 microns, i.e., $A_{12.8}/A_{4.25}$, and is then, indirectly, a relative measure of crystalline content.

The term "83/17 methanol-water wettability" as used herein refers to a characteristic which apparently depends on the proportion of deformed particles contained in the powder. The presence or absence of the characteristic may be readily determined by dropping a 2 gram sample of powder on the surface of 10 ml. of a solution consisting of 83.0 weight percent absolute methanol and 17.0 weight percent distilled water in a 15 ml. graduated cylinder, and shaking the mixture gently for about 30 seconds. If the test is negative, the powder particles do not darken appreciably, and ordinarily remain floating on the surface of the liquid, indicating that they have not been wetted. However, if the test is positive, the particles turn grayish and sink to the bottom of the cylinder, indicating that they have been wet by the liquid. In carrying out the test, the proportions of methanol and water are quite critical, since the test is not reliable if the methanol-water percentages vary as much as one percent.

The new powders may be prepared from suitable ordinary fine powders by a "water-cutting" procedure which in general, comprises slurrying such powders in a liquid medium, preferably water, and subjecting the slurry to the action of a high-speed bladed cutter until a major proportion of the polymer particles are deformed into the bola-shaped particles previously described. Pigments or fillers may be incorporated in the dispersion, or the slurry, or the final powders as desired.

Suitable intermediate powders may be obtained by ordinary coagulation of aqueous colloidal dispersions of roughly spherical polytetrafluoroethylene particles, preferably averaging from about 0.1 to 0.3 micron in diameter. Such dispersions may be prepared by various processes well known in the art. A convenient method is that described in U.S. Patent 2,750,350, issued to A. E. Kroll on June 12, 1956, Example I, runs D to K. The powders resulting from coagulation of such dispersions manifest an infra-red amorphous index of 0.15 or less, ordinarily about 0.10 or less. When obtained by usual coagulation procedures, such as those described in U.S. Patents 2,478,229, issued to K. L. Berry on August 9, 1949; 2,578,522, issued to D. E. Edgar on December 11, 1951; or (and preferably) 2,593,583, issued to J. F. Lontz on April 22, 1952, they manifest a positive 83/17 methanol-water wettability. High crystallinity as indicated by infra-red amorphous index not greater than 0.15 is an essential feature of both the novel fine powders of the present invention and of the suitable intermediate fine powders from which they may be prepared as well, since crystallinity is decreased to a slight extent rather than increased, by the aforementioned water-cutting procedure. Fine powders having an infra-red amorphous index markedly above 0.15 tend to yield flawed final articles when preformed and sintered, as do ordinary fine powders, and do not serve to accomplish the objects of the present invention. Accordingly, powders such as those obtainable by coagulation of the aqueous dispersions claimed in U.S. Patent 2,559,750 issued to K. L. Berry on July 10, 1951, which have an infra-red amorphous index of ordinarily about 0.40, are not suitable intermediates. While it is not intended to limit the scope of the invention by theory, it is believed that the particles of powders of low crystalline content are tougher and more elastic than those of high crystallinity, and hence not only are more difficult to preform adequately, but also, when deformed as in preforming tend to recover original shape during heating to sinter, and thus to yield flawed final articles.

In carrying out the water-cutting process, it is important that the presence of dispersing agents be minimized, since dispersing agents tend to interfere with the controlled shearing action which produces the bola-shaped particles characteristic of the powders of the present invention.

Hence, although the new powders can be prepared directly by water-cutting suitable unstabilized aqueous colloidal dispersions in the manner hereinafter described, because small amounts of dispersing agents are ordinarily present in dispersions, it is preferred to first coagulate the dispersion in any usual manner, for example, by the procedure of the aforesaid U.S. Patent 2,593,583, issued to J. F. Lontz on April 22, 1952, and then slurry the coagulated polymer in new water for the water-cutting step.

The proportion of powder in the water slurry is not critical, but is preferably in the range of 10 to 20 weight percent for most convenient operation. A wide variety of water-cutting apparatus can be used. Conveniently, there is employed apparatus comprising a cylindrical or frusto-conical container equipped with a stirrer having sharp mixing and cutting blades rotatable at a peripheral velocity of at least 2100, and preferably 5000–6000 feet per minute, such as a Waring Blendor or a Cowles: High Speed Dissolver. Somewhat more efficient water-cutting may be achieved by the use of a baffled container. However, baffling is not generally necessary, even in fairly large vessel, for convenient operation if the cutting blades are rotated at a peripheral velocity of 5000 feet per minute or more, and the blades are pitched so as to provide good recirculation of the slurry. The time required for adequate shearing will of course, vary with the efficiency of the apparatus. In general, however, with an unbaffled vessel, a slurry of 10 to 20 weight percent solids, a peripheral blade velocity of about 5500 feet per minute and cutter blades of the Waring Blendor type, the time required will be in the range of 3 to 45 minutes, and preferably 6 to 12 minutes.

Powders which have been inadequately water-cut are readily distinguished from the powders of the present invention since they manifest a positive 83/17 methanol-water wettability. Such powders retain their capacity for lubricated extrusion through fine orifices less than 10 mils in diameter at billet to orifice cross-sectional area reduction ratios of greater than 30 to 1, but cannot be readily calendered into non-porous sheeting, and when paste-molded under predominantly biaxial stress and then sintered, yield flawed final articles.

On the other hand, powders which have been excessively sheared are also readily distinguished, since on electron microscope examination, they do not contain a major proportion of bola-shaped particles, but instead consist mainly of small fibrous particles which are not attached to the generally spherical particles previously described. Such excessively sheared powders when lubricated and molded under predominantly biaxial stresses, yield products having small V-shaped surface flaws, and when calendered also tend to yield flawed porous products.

The invention is more particularly described and explained by means of the following examples, which, however, are not intended as limitations. In the examples, parts are by weight, except as otherwise indicated.

*Example I*

A. An aqueous colloidal dispersion of polytetrafluoroethylene, prepared by the procedure described in Example I, runs D to K, of U.S. Patent 2,750,350 issued to A. E.

Kroll on June 12, 1956, was used as a starting material. The dispersion was diluted, coagulated and dried by the process described in Example II of U.S. Patent 2,593,583 issued to J. F. Lontz on April 22, 1952, to obtain a fine powder. The powder obtained was typical of commercial fine powders, having a positive 83/17 methanol-water wettability, an infra-red amorphous index of about 0.09, and consisting almost entirely of generally spherical particles averaging 0.1 to 0.3 micron in diameter, with only a few elongated or fibrous particle portions, i.e., about 1 elongated or fibrous particle portion to every 4 to 15 non-elongated particles.

B. In a test of direct calenderability, the powder prepared by the procedure of paragraph A was hand-fed from above the nip of horizontally coplanar, "X-alloy"-surface, 6" diameter rolls, set about 12 mils apart, to yield a preformed product about 12 inches wide and 25 mils thick, at a rate of about one foot per minute. At a distance of about 2 feet from the bottom of the rolls, the product was picked up by an endless wire belt and thereby conveyed to and through an enclosed horizontal sintering oven about 10 feet long, heated by means of 30 end-to-end pairs of 2-kilowatt "Chromalox" infra-red heaters, spaced along the oven length above and below the path of travel of the calendered product.

The heaters were controlled by 10 powerstats adjusted so that the radiation intensity increased gradually to a maximum about ¾ of the way through the oven, and decreased gradually thereafter. Peak temperature within the oven was 380–400° C. The product obtained contained visible cracks and flaws.

C. In a modified calendering procedure, a compression plate of spring steel about one foot wide and 20 mils thick was covered first with a 20 mil thick felt of polyethylene terephthalate, and then with a 3 mil thick film of polyethylene terephthalate. Edge strips of synthetic rubber ⅛" thick and ¼" wide were laid down to define a cavity which was filled with the powder of paragraph A. The powder was then covered with upper sheets of film, felt and spring steel to form a sandwich, which was passed between a pair of vertically coplanar 6-inch diameter rolls set about 115 mils apart. On emergence of the sandwich the protective layers were carefully peeled away from the preformed sheet, which was transferred as peeled onto the conveyor belt and led to and through the sintering oven as described in paragraph B. A 20-foot long non-porous sheet 12" wide and 35 mils thick was obtained via this semi-continuous process, which however, was considerably more laborious and time-consuming than was the direct calendering process previously described.

D. In contrast to the foregoing, the water-cut powder of the present invention was found to be calenderable directly into non-porous sheeting by the process of paragraph B. In preparing the water-cut powder, one part of a powder prepared as in paragraph A above was slurried with 8 parts of water in a cylindrical stainless steel vessel of 24 parts water capacity, and then water-cut for 10 minutes with a sharp-bladed propeller stirrer, mounted on a shaft driver from above the vessel. The propeller blades were of the Waring Blendor type, pitched upward at an angle of about 45° to the horizontal, positioned and sized to clear the retaining walls and bottom of the container vessel by 1 to 2 inches. The peripheral velocity of the blades was about 5300 feet per minute. After the treatment, the water-cut powder was filtered off onto cheese cloth, spread onto trays, and dried 12 hours in a circulating air oven. The resulting powder, which is typical of the preferred powders of the present invention, manifested a negative 83/17 methanol-water wettability, an infra-red amorphous index of 0.10, and consisted mainly of the sub-microscopic bola-shaped particles previously described. In separate tests, it was found that the powder when lubricated was no longer extrudable in the conventional sense, i.e., it did not yield a flawless extrudate when lubricated, preformed into a billet, and then forced through an orifice having a cross-sectional area less than about 1/30 of the cross-sectional area of the billet.

E. In a number of direct calendering runs via the procedure of paragraph D, non-porous films and sheetings one foot wide ranging in thickness from 25 to 125 mils were continuously prepared. In general, the final thickness of the sintered sheets in mils was about 12 plus 1.2 times the gap in mils between the calendering rolls. The densities of the unsintered calendered preforms ranged from about 1.60 at 125 mils to about 1.90 at 20 mils, as compared with the 1.54 minimum calendered density which appears necessary for the preparation of adequately dense sintered articles from fine powder. They were markedly less fragile, judging by qualitative bending tests, than calendered products obtained with conventional fine powder. The density of the sintered final products ranged from 2.18 to 2.22. They were free of holes as judged by high voltage spark test, with a short time dielectric strength of about 660 volts per mil, and a $CO_2$ permeability rate of $2.5 \times 10^{-14}$ to $4.5 \times 10^{-14}$ in the units previously set forth. Permissible rate of production seemed limited only by the length of the sintering oven. In general, lowest permeability values were obtained with gently increased, extended heating, and gently decreased, extended cooling times, the extended gradual heating and cooling being particularly provided when the product was being taken through the 300–327°C. and 327–300° C. ranges. Maximum toughness, on the other hand, was achieved with gradual heating and quench cooling. Although it was also found that superior quality tape and film thinner than 20 mils could be calendered from the novel powders preferably using smaller diameter rolls heated to temperatures ranging from 100 to 300° C. for the the lower thicknesses, the new powders were considerably more difficult to feed to the rolls than (and in this were further distinguished from) ordinary fine powders. Accordingly, for products thinner than about 25 mils, the new powders were preferable to the ordinary materials only in special circumstances, where higher than usual quality justified the extra handling expense.

*Example II*

F. Ten parts of powder prepared as described in paragraph A was weighted into a cylindrical jar of about 35 parts water capacity with 1.5 parts of VM & P naphtha, and the jar was then sealed and rolled for 20 minutes to obtained a lubricated composition. One to 1.1 parts of this composition was charged to the mold cavity of a tumbler mold, which in vertical cross-section resembled a flower pot. The dimensions of the mold cavity were 2.272 inches at the base, tapering uniformly to a diameter of 2.842 inches at a height of 3.680 inches, the top of the mold proper, thence expanding horizontally to 3.513 inches and continuing vertically upward 1⅝ inch to form a seat for the male force plug. The cooperating male force plug had a diameter of 2.132 inches at the base, tapering uniformly to a diameter of 2.736 inches, at a height of 3.600 inches, thence expanding horizontally to 3.509 inches and continuing vertically upwards for 2 inches. The mold was installed in a 30-ton Watson Stillman press, and closed at a rate of 18 inches per minute to build up a mold force of 5 tons. Pressure was maintained until flash could be seen extruding around the parting line of the mold, usually between 10 and 30 seconds after full pressure was applied. The mold was then opened to minimize the flash and to prevent sticking to the male force plug. The resulting preform was freed from the mold cavity by blowing gently with air, causing partial drying and shrinking away from the cavity walls, and then removed. Following removal, the tumbler preform was dried in a steam-heated circulating air oven for 60 minutes at 120° C. Severe splitting all over the base was evident after drying. The product was transferred to an electrically-heated circulating air oven, heated for 30 minutes at 300° C., 90 minutes at 380° C., and finally 30 minutes at 300° C. The final product, density 2.16, was even more profoundly flawed than it had been after drying.

G. A large number of tumbler moldings prepared via the general procedure of paragraph F were attempted, varying lubricant content from 8 to 20 percent, with and without polyisobutylene lubricant viscosifiers, utilizing preforming mold forces of 2 to 30 tons, hold times of 3 to 120 seconds, mold temperatures of 15 to 175° C., and various grades and types of conventional fine powders and blends thereof, without success in obtaining crack-free final products.

H. Fine powder prepared as in paragraph D was lubricated, molded, dried and sintered, identically as described in paragraph F. The products had no flaws, and manifested an excellent surface. Tensile strength of the tumbler sides ranged between 3000 and 4000 pounds per square inch, with elongation at break of 400 to 600%. Densities ranged from 2.16 to 2.22. Under a pressure of 100 lb./sq. in., a methanol-dye solution required 10 to 75 minutes to permeate the tumbler, as evidenced by the appearance of dye color on the opposite side.

J. The results of a large number of moldings of the general kind described in paragraph H indicated naphtha as the preferred lubricant. In general, the use of viscosifiers with the lubricant was not desirable, since the higher viscosity lubricants were difficult to blend in. However, viscosified naphtha, as well as other liquid lubricants were operable, so long as they were removed by suitable means, such as volatilization or extraction prior to sintering the preform. Too low a lubricant content tended to result in the development of weak spots and visible flaw lines in the molded preforms, while too high a lubricant content resulted in preforms too weak to eject from the mold. Optimum lubricant content appeared to range from about 12 percent for very simple moldings to 18 percent for more complex articles. No useful advantage seemed apparent in operating above or below room temperature.

K. Powders prepared as in paragraph D, except that various water-cutting times were employed, were lubricated, molded, dried and sintered as described in paragraph F, with results as follows:

| Cutting Time, Minutes | No. Runs | Appearance of Molding |
| --- | --- | --- |
| 0 | 2 | Severe splitting all over base. |
| 1 | 2 | Severe split beneath surface of base. |
| 3 | 2 | Small split in center of base. |
| 6 | 2 | No flaws. |
| 12 | 2 | Do. |
| 45 | 2 | Small V-shaped surface flaws in sides. |

Powders cut 3 minutes or less showed a positive 83/17 methanol-water wettability. The powders cut for 45 minutes did not appear to consist mainly of bola-shaped particles, as seen under the electron microscope, but instead consisted mainly of elongated fibrous particles not connected to spherical particles.

L. Powders prepared as in paragraph D, except that 1% of "Triton" X–100 polyether dispersing agent was added to the slurry before cutting and various water-cutting times were employed, were lubricated, molded, dried and sintered as described in paragraph F, with results as follows:

| Cutting Time, Minutes | No. Runs | Appearance of Molding |
| --- | --- | --- |
| 1 | 3 | Split in center of base. |
| 3 | 3 | Do. |
| 6 | 3 | Two flawless, one split in base. |
| 12 | 1 | Base split. |
| 30 | 1 | Do. |

*Example III*

M. Powder prepared as in paragraph D and lubricated as described in paragraph F was shaped, dried, and sintered to a variety of flawless objects, including flanged thimbles, electrical coil forms, flanged tumblers, and the like. In fabricating these articles by molding, the molds used were designed and loaded so that the cross-sectional area of the mold cavity did not increase in the direction of flow to fill the mold, and so that it was not necessary for flow fronts to merge and weld together to achieve an integral article. Ordinarily, the mold cavities were designed so that the charge could be placed in the bottom of the mold and flow under pressure through a cavity decreasing in cross-sectional area in the direction of flow with a total decrease of not more than about 3/1. Equally good results were obtained where the cross-sectional area remained constant in the direction of flow. However, weak spots and flaws were obtained where cross-sectional area increased in the direction of flow. In molding flanged thimbles, it was found desirable to employ a male force plug fitted with a removable core. This step was necessary since the molded thimbles generally stick to the male force. In such instances, the core was removed to break the vacuum, making possible removal of intact undamaged preforms.

N. Blown bottles, 3 inches in diameter were readily fabricated from sintered flanged thimbles 1 inch in diameter with .120 wall thickness as in paragraph M, by reheating the thimbles to a temperature in the range of 300–327° C., expanding under 40 lb./sq. in. air pressure within a confined mold cavity and then cooling. Shapes thus blown manifested an "elastic memory" and consequently were readily shrunk fit to ensheath inserted objects by reheating the blown shape above 300° C.

*Example IV*

O. A lubricated composition prepared as described in paragraph H was continuously molded into electrical terminal blocks by charging it to a cylinder having a cross-sectional area about 3 times the cross-sectional area of the terminal block to be produced, and forcing the paste through a suitable die. The terminal block was of the kind which have hitherto been manufactured from molded sintered bars of polymer 1½" wide and ¾" thick, by milling ¼" deep cuts of ¼", ⅛", ⅛", ⅛", ⅛", ⅛", and ¼" width respectively, 1/15" apart along the longitudinal axis of the lower surface of the bar; milling a 3/16" deep cut 1" wide in the center along the longitudinal axis of the upper surface of the bar; and finally milling five ⅛" wide 1/16" deep cuts, 1/16" apart lengthwise in the bed of the inch-wide upper channel opposite the cuts of similar width in the lower surface. The extruded lengths were dried three hours at 120° C. in a steam oven, and then placed in an electrically-heated circulating air oven and put through a sintering cycle of one hour at 300–310° C., 3½ hours at 350° C., cooling in the oven to 300° C., and removal to cool in air. The sintered products were flawless.

In contrast to the foregoing, a similar lubricated composition prepared from powder of the kind described in paragraph A, extruded by the procedure of paragraph O, produced an extrudate which was weak in a direction perpendicular to the extrusion direction, and several of the small ribs were sheared off during the extrusion. On sintering splits developed at the ends of the block.

I claim:

Polytetrafluoroethylene fine powder having a total surface area of at least 9 square meters per gram, predominantly comprising spheroidal particles 0.1 to 0.3 micron in diameter interconnected by elongated threads 0.01 to 0.05 micron in diameter, said powder having an infrared amorphous index of less than 0.15 as determined by the ratio of net absorbance at 12.8 microns wave length to net absorbance at 4.25 microns wave length measured upon a pressed film of the powder, and negative wettability by a mixture of 83.0 weight percent methanol and 17.0 weight percent water.

References Cited in the file of this patent

UNITED STATES PATENTS

| | | |
|---|---|---|
| 2,392,389 | Joyce | Jan. 8, 1946 |
| 2,396,629 | Alfthan et al. | Mar. 19, 1946 |
| 2,400,099 | Brubaker et al. | May 14, 1946 |
| 2,440,190 | Alfthan | Apr. 20, 1948 |
| 2,559,750 | Berry | July 10, 1951 |
| 2,593,583 | Lontz | Apr. 22, 1952 |
| 2,715,617 | White | Aug. 16, 1955 |
| 2,718,452 | Lontz | Sept. 20, 1955 |
| 2,781,552 | Gray | Feb. 19, 1957 |
| 2,782,180 | Weidman | Feb. 19, 1957 |
| 2,791,806 | Tordella | May 14, 1957 |